US009658620B1

(12) United States Patent
Urmson et al.

(10) Patent No.: US 9,658,620 B1
(45) Date of Patent: May 23, 2017

(54) SYSTEM AND METHOD OF PROVIDING RECOMMENDATIONS TO USERS OF VEHICLES

(71) Applicant: Waymo LLC, Mountain View, CA (US)

(72) Inventors: Christopher Paul Urmson, Mountain View, CA (US); Dmitri A. Dolgov, Los Altos, CA (US); Andrew Hughes Chatham, San Francisco, CA (US); Philip Nemec, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 114 days.

(21) Appl. No.: 14/727,273

(22) Filed: Jun. 1, 2015

Related U.S. Application Data

(63) Continuation of application No. 13/252,568, filed on Oct. 4, 2011, now abandoned.

(60) Provisional application No. 61/391,271, filed on Oct. 8, 2010, provisional application No. 61/390,094, filed on Oct. 5, 2010.

(51) Int. Cl.
*B62D 6/00* (2006.01)
*G05D 1/02* (2006.01)
*G05D 1/00* (2006.01)
*G01C 21/36* (2006.01)

(52) U.S. Cl.
CPC ....... *G05D 1/0088* (2013.01); *G01C 21/3617* (2013.01); *G05D 1/0276* (2013.01); *B62D 6/00* (2013.01)

(58) Field of Classification Search
None
See application file for complete search history.

(56) References Cited

U.S. PATENT DOCUMENTS

| | | | |
|---|---|---|---|
| 1,924,984 A | 8/1933 | Fageol |
| 3,186,508 A | 6/1965 | Lamont |
| 3,324,805 A | 6/1967 | Mulch |
| 3,596,728 A | 8/1971 | Neville |
| 4,372,414 A | 2/1983 | Anderson et al. |
| 4,387,783 A | 6/1983 | Carman |
| 4,656,834 A | 4/1987 | Elpern |

(Continued)

FOREIGN PATENT DOCUMENTS

| | | |
|---|---|---|
| CN | 101073018 A | 11/2007 |
| CN | 101364111 A | 2/2009 |

(Continued)

OTHER PUBLICATIONS

Extended European Search Report for EP Patent Application No. 11831503.5, dated Dec. 3, 2015.

(Continued)

*Primary Examiner* — Shelley Chen
(74) *Attorney, Agent, or Firm* — Lerner, David, Littenberg, Krumholz & Mentlik, LLP

(57) ABSTRACT

A system and method is provided of providing recommendations to a user of a vehicle. In one aspect, the vehicle navigates autonomously and the sensors provide information that is based on the location of the vehicle and output from sensors directed to the environment surrounding the vehicle. In further aspects, both current and previous sensor data is used to make the recommendation, as well as data based on the sensors of other vehicles.

9 Claims, 5 Drawing Sheets

(56) References Cited

U.S. PATENT DOCUMENTS

| | | |
|---|---|---|
| 4,924,795 A | 5/1990 | Ottemann |
| 4,970,653 A | 11/1990 | Kenue |
| 4,982,072 A | 1/1991 | Takigami |
| 5,187,666 A | 2/1993 | Watanabe |
| 5,415,468 A | 5/1995 | Latarnik et al. |
| 5,448,487 A | 9/1995 | Arai |
| 5,470,134 A | 11/1995 | Toepfer et al. |
| 5,521,579 A | 5/1996 | Bernhard |
| 5,684,696 A | 11/1997 | Rao et al. |
| 5,774,069 A | 6/1998 | Tanaka et al. |
| 5,790,403 A | 8/1998 | Nakayama |
| 5,906,645 A | 5/1999 | Kagawa et al. |
| 5,913,376 A | 6/1999 | Takei |
| 5,954,781 A | 9/1999 | Slepian et al. |
| 6,055,042 A | 4/2000 | Sarangapani |
| 6,064,926 A | 5/2000 | Sarangapani et al. |
| 6,070,682 A | 6/2000 | Isogai et al. |
| 6,151,539 A | 11/2000 | Bergholz et al. |
| 6,195,610 B1 | 2/2001 | Kaneko |
| 6,226,570 B1 | 5/2001 | Hahn |
| 6,321,147 B1 | 11/2001 | Takeda et al. |
| 6,332,354 B1 | 12/2001 | Lalor |
| 6,343,247 B2 | 1/2002 | Jitsukata et al. |
| 6,385,539 B1 | 5/2002 | Wilson et al. |
| 6,414,635 B1 | 7/2002 | Stewart et al. |
| 6,438,472 B1 | 8/2002 | Tano et al. |
| 6,438,491 B1 | 8/2002 | Farmer |
| 6,453,056 B2 | 9/2002 | Laumeyer et al. |
| 6,470,874 B1 | 10/2002 | Mertes |
| 6,504,259 B1 | 1/2003 | Kuroda et al. |
| 6,516,262 B2 | 2/2003 | Takenaga et al. |
| 6,560,529 B1 | 5/2003 | Janssen |
| 6,591,172 B2 | 7/2003 | Oda et al. |
| 6,606,557 B2 | 8/2003 | Kotzin |
| 6,643,576 B1 | 11/2003 | O Connor et al. |
| 6,832,156 B2 | 12/2004 | Farmer |
| 6,836,719 B2 | 12/2004 | Andersson et al. |
| 6,847,869 B2 | 1/2005 | Dewberry et al. |
| 6,862,524 B1 | 3/2005 | Nagda et al. |
| 6,876,908 B2 | 4/2005 | Cramer et al. |
| 6,934,613 B2 | 8/2005 | Yun |
| 6,963,657 B1 | 11/2005 | Nishigaki et al. |
| 7,011,186 B2 | 3/2006 | Frentz et al. |
| 7,031,829 B2 | 4/2006 | Nisiyama |
| 7,085,633 B2 | 8/2006 | Nishira et al. |
| 7,102,496 B1 | 9/2006 | Ernst, Jr. et al. |
| 7,177,760 B2 | 2/2007 | Kudo |
| 7,194,347 B2 | 3/2007 | Harumoto et al. |
| 7,207,304 B2 | 4/2007 | Iwatsuki et al. |
| 7,233,861 B2 | 6/2007 | Van Buer et al. |
| 7,327,242 B2 | 2/2008 | Holloway et al. |
| 7,340,332 B2 | 3/2008 | Underdahl et al. |
| 7,346,439 B2 | 3/2008 | Bodin |
| 7,373,237 B2 | 5/2008 | Wagner et al. |
| 7,394,046 B2 | 7/2008 | Olsson et al. |
| 7,486,802 B2 | 2/2009 | Hougen |
| 7,499,774 B2 | 3/2009 | Barrett et al. |
| 7,499,776 B2 | 3/2009 | Allard et al. |
| 7,499,804 B2 | 3/2009 | Svendsen et al. |
| 7,515,101 B1 | 4/2009 | Bhogal et al. |
| 7,565,241 B2 | 7/2009 | Tauchi |
| 7,579,942 B2 | 8/2009 | Kalik |
| 7,656,280 B2 | 2/2010 | Hines et al. |
| 7,694,555 B2 | 4/2010 | Howell et al. |
| 7,778,759 B2 | 8/2010 | Tange et al. |
| 7,818,124 B2 | 10/2010 | Herbst et al. |
| 7,835,859 B2 | 11/2010 | Bill |
| 7,865,277 B1 | 1/2011 | Larson et al. |
| 7,894,951 B2 | 2/2011 | Norris et al. |
| 7,908,040 B2 | 3/2011 | Howard et al. |
| 7,956,730 B2 | 6/2011 | White et al. |
| 7,979,175 B2 | 7/2011 | Allard et al. |
| 8,024,102 B2 | 9/2011 | Swoboda et al. |
| 8,050,863 B2 | 11/2011 | Trepagnier et al. |
| 8,078,349 B1 | 12/2011 | Prada Gomez et al. |
| 8,095,313 B1 | 1/2012 | Blackburn |
| 8,099,213 B2 | 1/2012 | Zhang et al. |
| 8,126,642 B2 | 2/2012 | Trepagnier et al. |
| 8,190,322 B2 | 5/2012 | Lin et al. |
| 8,194,927 B2 | 6/2012 | Zhang et al. |
| 8,195,341 B2 | 6/2012 | Huang et al. |
| 8,244,408 B2 | 8/2012 | Lee et al. |
| 8,244,458 B1 | 8/2012 | Blackburn |
| 8,260,515 B2 | 9/2012 | Huang et al. |
| 8,280,601 B2 | 10/2012 | Huang et al. |
| 8,280,623 B2 | 10/2012 | Trepagnier et al. |
| 8,311,274 B2 | 11/2012 | Bergmann et al. |
| 8,352,111 B2 | 1/2013 | Mudalige |
| 8,352,112 B2 | 1/2013 | Mudalige |
| 8,412,449 B2 | 4/2013 | Trepagnier et al. |
| 8,452,506 B2 * | 5/2013 | Groult ............... G01S 15/931 303/193 |
| 8,457,827 B1 * | 6/2013 | Ferguson ............ G05D 1/00 180/169 |
| 8,634,980 B1 | 1/2014 | Urmson et al. |
| 8,694,236 B2 | 4/2014 | Takagi |
| 8,706,394 B2 | 4/2014 | Trepagnier et al. |
| 8,718,861 B1 | 5/2014 | Montemerlo et al. |
| 8,724,093 B2 | 5/2014 | Sakai et al. |
| 8,775,063 B2 | 7/2014 | Zeng |
| 8,831,813 B1 | 9/2014 | Ferguson et al. |
| 8,855,860 B2 | 10/2014 | Isaji et al. |
| 8,874,267 B1 | 10/2014 | Dolgov et al. |
| 8,918,277 B2 | 12/2014 | Niem et al. |
| 8,929,604 B2 | 1/2015 | Platonov et al. |
| 8,948,954 B1 * | 2/2015 | Ferguson ............ B60W 30/12 701/23 |
| 8,949,016 B1 | 2/2015 | Ferguson et al. |
| 8,970,397 B2 | 3/2015 | Nitanda et al. |
| 8,972,093 B2 | 3/2015 | Joshi |
| 9,008,369 B2 | 4/2015 | Schofield et al. |
| 9,062,979 B1 | 6/2015 | Ferguson et al. |
| 9,063,548 B1 * | 6/2015 | Ferguson ............ G05D 1/0231 |
| 9,081,383 B1 | 7/2015 | Montemerlo et al. |
| 9,182,759 B2 | 11/2015 | Wimmer et al. |
| 2001/0037927 A1 | 11/2001 | Nagler et al. |
| 2002/0188499 A1 | 12/2002 | Jenkins et al. |
| 2003/0014302 A1 | 1/2003 | Jablin |
| 2003/0016804 A1 | 1/2003 | Sheha et al. |
| 2003/0037977 A1 | 2/2003 | Tatara et al. |
| 2003/0055554 A1 | 3/2003 | Shioda et al. |
| 2003/0093209 A1 | 5/2003 | Andersson et al. |
| 2003/0125963 A1 | 7/2003 | Haken |
| 2004/0243292 A1 | 12/2004 | Roy |
| 2005/0012589 A1 | 1/2005 | Kokubu et al. |
| 2005/0099146 A1 | 5/2005 | Nishikawa et al. |
| 2005/0125154 A1 | 6/2005 | Kawasaki |
| 2005/0131645 A1 | 6/2005 | Panopoulos |
| 2005/0149251 A1 | 7/2005 | Donath et al. |
| 2005/0273251 A1 | 12/2005 | Nix et al. |
| 2006/0037573 A1 | 2/2006 | Iwatsuki et al. |
| 2006/0082437 A1 | 4/2006 | Yuhara |
| 2006/0089764 A1 | 4/2006 | Filippov et al. |
| 2006/0089765 A1 | 4/2006 | Pack et al. |
| 2006/0089800 A1 | 4/2006 | Svendsen et al. |
| 2006/0116801 A1 | 6/2006 | Shirley et al. |
| 2006/0173841 A1 | 8/2006 | Bill |
| 2006/0178240 A1 | 8/2006 | Hansel |
| 2006/0276942 A1 | 12/2006 | Anderson et al. |
| 2007/0010942 A1 | 1/2007 | Bill |
| 2007/0024501 A1 | 2/2007 | Yeh |
| 2007/0142992 A1 | 6/2007 | Gronau et al. |
| 2007/0149214 A1 | 6/2007 | Walsh et al. |
| 2007/0165910 A1 | 7/2007 | Nagaoka et al. |
| 2007/0193798 A1 | 8/2007 | Allard et al. |
| 2007/0203617 A1 * | 8/2007 | Haug ............... B62D 15/029 701/1 |
| 2007/0225909 A1 | 9/2007 | Sakano |
| 2007/0239331 A1 | 10/2007 | Kaplan |
| 2007/0247281 A1 | 10/2007 | Shimomura |
| 2007/0279250 A1 | 12/2007 | Kume et al. |
| 2008/0021628 A1 | 1/2008 | Tryon |
| 2008/0033615 A1 | 2/2008 | Khajepour et al. |
| 2008/0039991 A1 | 2/2008 | May et al. |

(56) References Cited

U.S. PATENT DOCUMENTS

| | | |
|---|---|---|
| 2008/0040039 A1 | 2/2008 | Takagi |
| 2008/0056535 A1 | 3/2008 | Bergmann et al. |
| 2008/0059015 A1 | 3/2008 | Whittaker et al. |
| 2008/0059048 A1 | 3/2008 | Kessler et al. |
| 2008/0084283 A1 | 4/2008 | Kalik |
| 2008/0089556 A1 | 4/2008 | Salgian et al. |
| 2008/0120025 A1 | 5/2008 | Naitou et al. |
| 2008/0120171 A1 | 5/2008 | Ikeuchi et al. |
| 2008/0147253 A1 | 6/2008 | Breed |
| 2008/0161987 A1 | 7/2008 | Breed |
| 2008/0167771 A1 | 7/2008 | Whittaker et al. |
| 2008/0183512 A1 | 7/2008 | Benzinger et al. |
| 2008/0188246 A1 | 8/2008 | Sheha et al. |
| 2008/0195268 A1 | 8/2008 | Sapilewski et al. |
| 2008/0277183 A1 | 11/2008 | Huang et al. |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0074249 A1 | 3/2009 | Moed et al. |
| 2009/0082879 A1 | 3/2009 | Dooley et al. |
| 2009/0115594 A1 | 5/2009 | Han |
| 2009/0164071 A1 | 6/2009 | Takeda |
| 2009/0198400 A1 | 8/2009 | Allard et al. |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0306834 A1 | 12/2009 | Hjelm et al. |
| 2009/0313077 A1 | 12/2009 | Wheeler, IV |
| 2009/0313095 A1 | 12/2009 | Hurpin |
| 2009/0319096 A1 | 12/2009 | Offer et al. |
| 2009/0319112 A1 | 12/2009 | Fregene et al. |
| 2009/0322872 A1 | 12/2009 | Muehlmann et al. |
| 2009/0326799 A1 | 12/2009 | Crook |
| 2010/0010699 A1 | 1/2010 | Taguchi et al. |
| 2010/0014714 A1 | 1/2010 | Zhang et al. |
| 2010/0017056 A1 | 1/2010 | Asakura et al. |
| 2010/0042282 A1* | 2/2010 | Taguchi ............... G08G 1/161 701/25 |
| 2010/0052945 A1 | 3/2010 | Breed |
| 2010/0066587 A1 | 3/2010 | Yamauchi et al. |
| 2010/0076640 A1 | 3/2010 | Maekawa et al. |
| 2010/0079590 A1 | 4/2010 | Kuehnle et al. |
| 2010/0179715 A1 | 7/2010 | Puddy |
| 2010/0179720 A1 | 7/2010 | Lin et al. |
| 2010/0191433 A1 | 7/2010 | Groult |
| 2010/0198491 A1 | 8/2010 | Mays |
| 2010/0205132 A1 | 8/2010 | Taguchi |
| 2010/0207787 A1 | 8/2010 | Catten et al. |
| 2010/0228419 A1 | 9/2010 | Lee et al. |
| 2010/0241297 A1 | 9/2010 | Aoki et al. |
| 2010/0253542 A1 | 10/2010 | Seder et al. |
| 2010/0256836 A1 | 10/2010 | Mudalige |
| 2010/0265354 A1 | 10/2010 | Kameyama |
| 2011/0010131 A1 | 1/2011 | Miyajima et al. |
| 2011/0040481 A1 | 2/2011 | Trombley et al. |
| 2011/0071718 A1 | 3/2011 | Norris et al. |
| 2011/0099040 A1 | 4/2011 | Felt et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0210866 A1 | 9/2011 | David et al. |
| 2011/0213511 A1 | 9/2011 | Visconti et al. |
| 2011/0239146 A1 | 9/2011 | Dutta et al. |
| 2011/0246156 A1 | 10/2011 | Zecha et al. |
| 2011/0254655 A1 | 10/2011 | Maalouf et al. |
| 2011/0264317 A1 | 10/2011 | Druenert et al. |
| 2012/0053775 A1 | 3/2012 | Nettleton et al. |
| 2012/0069185 A1* | 3/2012 | Stein ............... G06K 9/00798 348/148 |
| 2012/0083960 A1 | 4/2012 | Zhu et al. |
| 2012/0114178 A1 | 5/2012 | Platonov et al. |
| 2012/0157052 A1 | 6/2012 | Quade |
| 2012/0271483 A1 | 10/2012 | Samukawa et al. |
| 2012/0277947 A1 | 11/2012 | Boehringer et al. |
| 2012/0283912 A1 | 11/2012 | Lee et al. |
| 2012/0314070 A1* | 12/2012 | Zhang ............... B60W 40/00 348/148 |
| 2013/0035821 A1 | 2/2013 | Bonne et al. |
| 2013/0054049 A1 | 2/2013 | Uno |
| 2013/0054106 A1 | 2/2013 | Schmudderich et al. |
| 2013/0054128 A1 | 2/2013 | Moshchuk et al. |
| 2013/0144520 A1 | 6/2013 | Ricci |
| 2013/0179382 A1 | 7/2013 | Fritsch et al. |
| 2013/0282277 A1 | 10/2013 | Rubin et al. |
| 2013/0321400 A1 | 12/2013 | van Os et al. |
| 2013/0321422 A1 | 12/2013 | Pahwa et al. |
| 2014/0067187 A1 | 3/2014 | Ferguson et al. |
| 2014/0088855 A1 | 3/2014 | Ferguson |
| 2014/0156164 A1 | 6/2014 | Schuberth et al. |
| 2014/0195138 A1 | 7/2014 | Stelzig et al. |
| 2014/0214255 A1 | 7/2014 | Dolgov et al. |
| 2014/0350836 A1 | 11/2014 | Stettner et al. |
| 2014/0369168 A1 | 12/2014 | Max et al. |
| 2015/0112571 A1* | 4/2015 | Schmudderich ...... B60W 30/08 701/93 |
| 2015/0153735 A1 | 6/2015 | Clarke et al. |
| 2015/0177007 A1 | 6/2015 | Su et al. |
| 2015/0198951 A1 | 7/2015 | Thor et al. |
| 2015/0203107 A1 | 7/2015 | Lippman |
| 2015/0293216 A1 | 10/2015 | O'Dea et al. |
| 2015/0302751 A1* | 10/2015 | Strauss ............... B60T 7/22 701/41 |
| 2016/0327947 A1* | 11/2016 | Ishikawa ............... B60W 50/08 |
| 2016/0334230 A1* | 11/2016 | Ross ............... G01C 21/34 |
| 2016/0334797 A1* | 11/2016 | Ross ............... G05D 1/0217 |

FOREIGN PATENT DOCUMENTS

| | | |
|---|---|---|
| CN | 101522493 A | 9/2009 |
| DE | 10218010 A1 | 11/2003 |
| DE | 10336986 A1 | 3/2005 |
| DE | 102009010006 A1 | 10/2009 |
| DE | 102008023380 A1 | 11/2009 |
| EP | 0884666 A1 | 12/1998 |
| EP | 2042405 A2 | 4/2009 |
| EP | 2216225 A1 | 8/2010 |
| FR | 2692064 A1 | 12/1993 |
| JP | H05-246635 A | 9/1993 |
| JP | H09-161196 A | 4/1996 |
| JP | 09066853 | 3/1997 |
| JP | 09-160643 A | 6/1997 |
| JP | H09-161196 A | 6/1997 |
| JP | H09-166209 A | 6/1997 |
| JP | H11-039598 A | 2/1999 |
| JP | 11282530 | 10/1999 |
| JP | 2000149188 A | 5/2000 |
| JP | 2000-193471 A | 7/2000 |
| JP | 2000305625 A | 11/2000 |
| JP | 2000338008 A | 12/2000 |
| JP | 2001-101599 A | 4/2001 |
| JP | 2002236993 A | 8/2002 |
| JP | 2002251690 A | 9/2002 |
| JP | 2003081039 A | 3/2003 |
| JP | 2003162799 A | 6/2003 |
| JP | 2003-205804 A | 7/2003 |
| JP | 2004-206510 A | 7/2004 |
| JP | 2004-326730 A | 11/2004 |
| JP | 2004-345862 A | 12/2004 |
| JP | 2005067483 A | 3/2005 |
| JP | 2005071114 A | 3/2005 |
| JP | 2005-297621 A | 10/2005 |
| JP | 2005339181 A | 12/2005 |
| JP | 2006-264530 A | 10/2006 |
| JP | 2006322752 A | 11/2006 |
| JP | 2007001475 A | 1/2007 |
| JP | 2007-022135 A | 2/2007 |
| JP | 2007-331458 A | 12/2007 |
| JP | 2008087545 A | 4/2008 |
| JP | 2008117082 A | 5/2008 |
| JP | 2008152655 A | 7/2008 |
| JP | 2008170404 A | 7/2008 |
| JP | 2008213581 A | 9/2008 |
| JP | 2008290680 A | 12/2008 |

(56) References Cited

FOREIGN PATENT DOCUMENTS

| | | |
|---|---|---|
| JP | 2009026321 A | 2/2009 |
| JP | 2009053925 A | 3/2009 |
| JP | 2009075638 A | 4/2009 |
| JP | 2010128637 A | 6/2010 |
| JP | 2010-173530 A | 8/2010 |
| JP | 2010-182207 A | 8/2010 |
| JP | 2010-191803 A | 9/2010 |
| WO | 0070941 A1 | 11/2000 |
| WO | 0188827 A1 | 11/2001 |
| WO | 2005013235 A1 | 2/2005 |
| WO | 2007145564 A1 | 12/2007 |
| WO | 2009028558 A1 | 3/2009 |
| WO | 2009155228 A1 | 12/2009 |
| WO | 2011021046 A1 | 2/2011 |

OTHER PUBLICATIONS

Japanese Office Action for Application No. 2013-532908 dated Sep. 8, 2015.
Notice of Reasons for Rejection for Japanese Patent Application No. 2013-532909, dated Nov. 25, 2015.
Tiwari et al.: "Survival analysis: Pedestrian risk exposure at signalized intersections." Transportation Research Part F: Traffic Psychology and Behaviour, Pergamon, Amsterdam, NL, vol. 10, No. 2, Dec. 12, 2006 (Dec. 12, 2006), pp. 77-89, XP005802066, ISSN: 1369-8478, DOI: 10.1016/J.TRF.2006.06.002.
"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.
"Google Cars Drive Themselves, in Traffic" [online]. [Retrieved Aug. 19, 2011] Retrieved from the internet: <http://www.nytimes.com/2010/10/10/science/10google.html>, 4 pages.
Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for the 2007 DARPA Urban Challenge, Dec. 2007, 27 pages.
Eric Guizzo, How's Google's Self-Driving Car Works, IEEE. Org, IEEE, Oct. 18, 2011, pp. 1/31/-31/31.
International Search Report and the Written Opinion for Application No. PCT/US 2011/054154, Apr. 24, 2012.
International Search Report and the Written Opinion for Application No. PCT/US 2011/054896, Apr. 25, 2012.
International Search Report and Written Opinion for Application No. PCT/US2013/061604 dated Jul. 3, 2014.
International Search Report and Written Opinion for Application No. PCT/US2011/054899 dated May 4, 2012.
Jaffe, "The First Look at How Google's Self-Driving Car Handles City Streets", The Atlantic City Lab, Apr. 28, 2014.
Martin Schonhof, Martin Treiber, Arne Kesting, and Dirk Helbing, Autonomous Detection and Anticipation of Jam Fronts From Messages Propagated by Intervehicle Communication, 2007, pp. 3-12.
Matthew McNaughton, Motion Planning for Autonomous Driving with a Conformal Spatiotempral Lattice, Internation Conference on Robotics and Automation, May 9-13, pp. 4889-4895.
Vincenzo DiLecce and Marco Calabrese, Experimental System to Support Real-Time Driving Pattern Recognition, 2008, pp. 1192-1199.
Chinese Office Action for Application No. 201180057942.8 dated Jun. 3, 2015.
Chinese Office Action for Application No. 201180057954.0 dated Apr. 29, 2015.
Notice of Preliminary Rejection for Korean Patent Application No. 10-2013-7011657 dated Feb. 1, 2016.
Notice of Reasons for Rejection for Japanese Patent Application No. 2013-532909 dated May 26, 2016.
Supplementary Partial European Search Report for European Patent Application No. 11831605.0, dated Dec. 20, 2016.
"TomTom GO user manual." Oct. 1, 2007 (Oct. 1, 2007). XP055123040. Retrieved from the Internet: <http://download.tomtom.com/open/manuals/device/refman/TomTom-GO-en-GB.pdf>. 100 pages.
Extended European Search Report for European Patent Application No. 11831362.6, dated Mar. 14, 2017. 11 pages.

\* cited by examiner

SYSTEM AND METHOD OF PROVIDING RECOMMENDATIONS TO USERS OF VEHICLES

CROSS-REFERENCE TO RELATED APPLICATIONS

The present application is a continuation of U.S. patent application Ser. No. 13/252,568, filed on Oct. 4, 2011, which claims the benefit of the filing dates of U.S. Provisional Application No. 61/390,094, entitled "AUTONOMOUS VEHICLES," filed Oct. 5, 2010, and U.S. Provisional Application No. 61/391,271, entitled "AUTONOMOUS VEHICLES," filed Oct. 8, 2010, the entire disclosures of which are hereby incorporated herein by reference.

BACKGROUND

Autonomous vehicles may be configured to be driven in a manual mode (where the operator exercises a high degree of control over the movement of the vehicle) or in an autonomous mode (where the vehicle essentially drives itself). These vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode to an autonomous mode and to modes that lie somewhere in between.

A vehicle with autonomous driving capability is configured to receive signal inputs from the sensors that monitor the vehicle operations, surrounding objects and road conditions in order to identify safety hazards and generate countermeasures to deal with various driving situations. The autonomous vehicle may also collect and record data from various information sources such as cellular network, satellites as well as user inputs such as users' identification, destinations and routes of navigation requests and vehicle operation preferences.

SUMMARY

In one aspect, a method of determining a route for a vehicle is provided. It includes receiving data from a sensor affixed to a vehicle that senses, at one point in time, the environment surrounding the vehicle. It also includes accessing data stored in a memory that was previously sensed by a sensor affixed to the vehicle at an earlier point in time. A destination is determined from the received and accessed data and is identified to a user of the vehicle, such as by suggesting the destination.

In another aspect, a system includes a processor as well as a memory containing instructions. The processor is processor capable of executing instructions and is affixed to an autonomous vehicle. The memory contains instructions and data that are accessible by the processor. The data includes the output of a sensor affixed to the vehicle that was obtained by the vehicle both during the current trip and a trip earlier than the current trip. The instructions include: receiving a destination entered by a user determining an action to be performed by the vehicle (where the action is determined based on sensors that identify the location of a vehicle and sensors that do not identify the location of a vehicle) and recommending the action to the user.

In still another aspect, a method of recommending an action is provided. The method includes receiving the output of a first sensor affixed to a first vehicle, such that the output was captured during a first time frame. The first vehicle also receives the output of a second sensor affixed to a second vehicle, where that output was captured during a second time frame occurring after the first time frame. A processor affixed to the first vehicle determines a recommendation to be provided to the user based on the output of the first and second sensors. The recommendation relates to automatically navigating the first vehicle. The recommendation is provided to the user and the first vehicle performs the recommendation depending on whether the user provided an indication that the recommendation was accepted.

DETAILED DESCRIPTION

In one aspect, a system and method is provided wherein an autonomous vehicle makes recommendations to a user based on the conditions detected by the car's sensors. The recommendation may be based on both previous and currently sensed conditions, such as recommending a destination based on the location of prior long stops by the vehicle as well as the sensed weather conditions. The sensor data may be provided by other vehicles with sensors, and the recommendations may be communicated to other vehicles.

Figure 1:
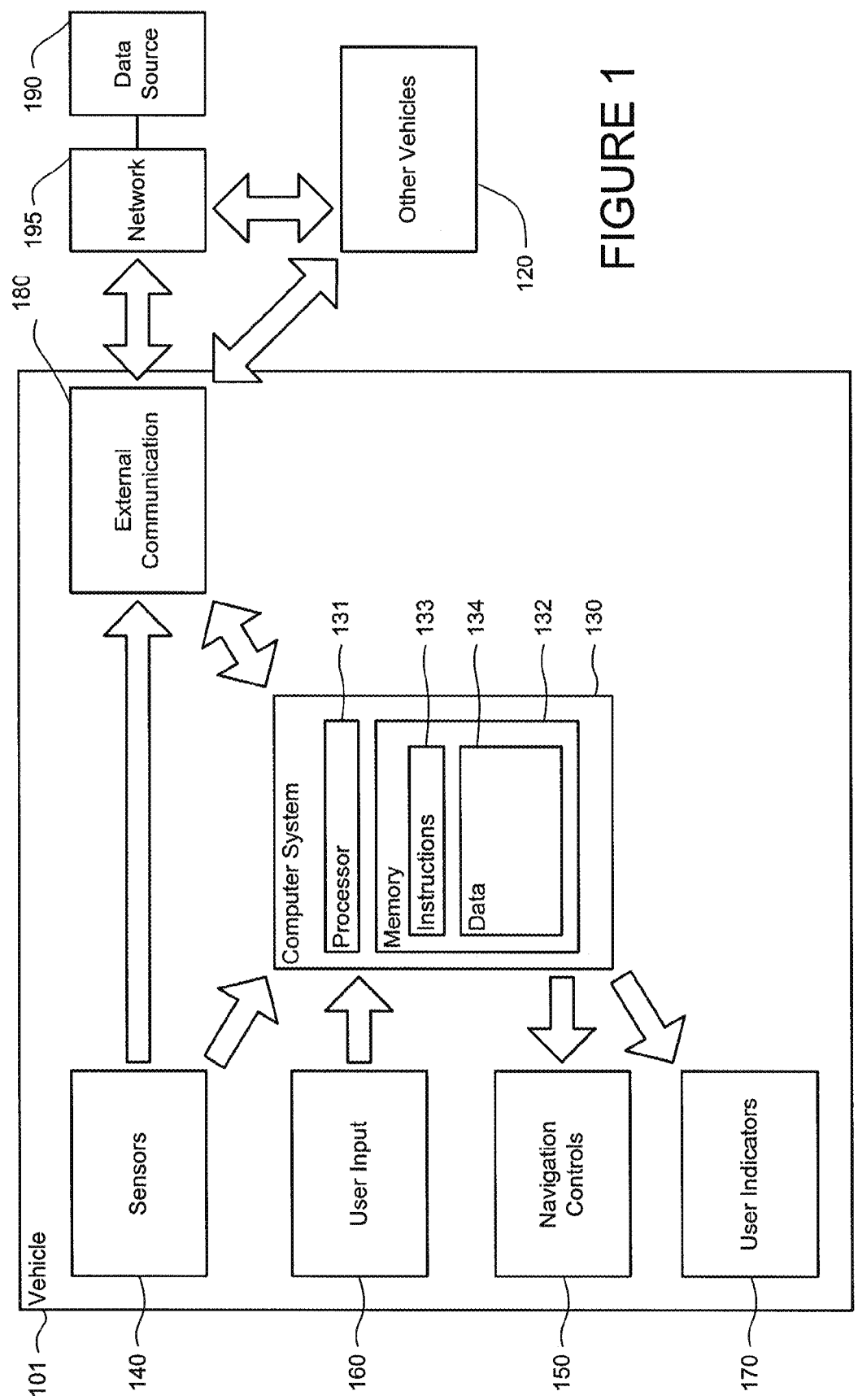
FIG. 1 is a functional diagram of a system.

FIG. 1 illustrates one possible aspect of an autonomous driving system. The system includes a vehicle 101 that may be in communication with a data repository 190 and other vehicles 120.

Although certain aspects of the invention are particularly useful in connection with specific types of vehicles, vehicle 101 may be any type of vehicle. Possible vehicles include, by way of example only, cars, trucks, motorcycles, busses, boats, airplanes, helicopters, lawnmowers, recreational vehicles, amusement park vehicles, trams, golf carts, trains and trolleys.

Vehicle 101 may include an autonomous vehicle computer system 130 that is in communication with sensors 140, navigation control 150, user input 160, user indicators 170 and external communication component 180.

Computer system 130 may comprise a computer containing a processor 131, memory 132 and other components typically present in general purpose computers.

The memory 132 stores information accessible by processor 131, including instructions 133 and data 134 that may be executed or otherwise used by the processor 131. The memory 132 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 133 may be any set of instructions to be executed directly (such as machine code) or indirectly (such as scripts) by the processor. For example, the instructions may be stored as computer code on a computer-readable medium. In that regard, the terms "instructions" and "programs" may be used interchangeably herein. The instructions may be stored in object code format for direct processing by the processor, or in any other computer language including scripts or collections of independent source code modules that are interpreted on demand. Functions, methods and routines of the instructions are explained in more detail below.

The data 134 may be retrieved, stored or modified by processor 131 in accordance with the instructions 133. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 131 may be any conventional processor, such as processors from Intel Corporation or Advanced Micro Devices. Alternatively, the processor may be a dedicated device such as an ASIC. Although FIG. 1 functionally illustrates the processor, memory, and other elements of central control 130 as being within the same block, it will be understood by those of ordinary skill in the art that the processor and memory may actually comprise multiple processors and memories that may or may not be stored within the same physical housing. For example, rather than being stored in the same computer, processor 131 and memory 132 may be stored in separate devices. Although there may be advantages to locating the processor 131 and memory 132 within vehicle 110, various processes may be performed external to the vehicle and various data may be stored outside of the vehicle. For example, if a processor or memory used or required by the vehicle 101 occurs in an external device, vehicle 101 may obtain the information it requires wirelessly. Accordingly, although references to a processor or memory herein will assume that the processor and memory are affixed to vehicle 101, such references will be understood to include references to a collection of processors or computers or memories that may or may not operate in parallel and may or may not be located within or affixed to the vehicle 101.

Sensors

Figure 2:
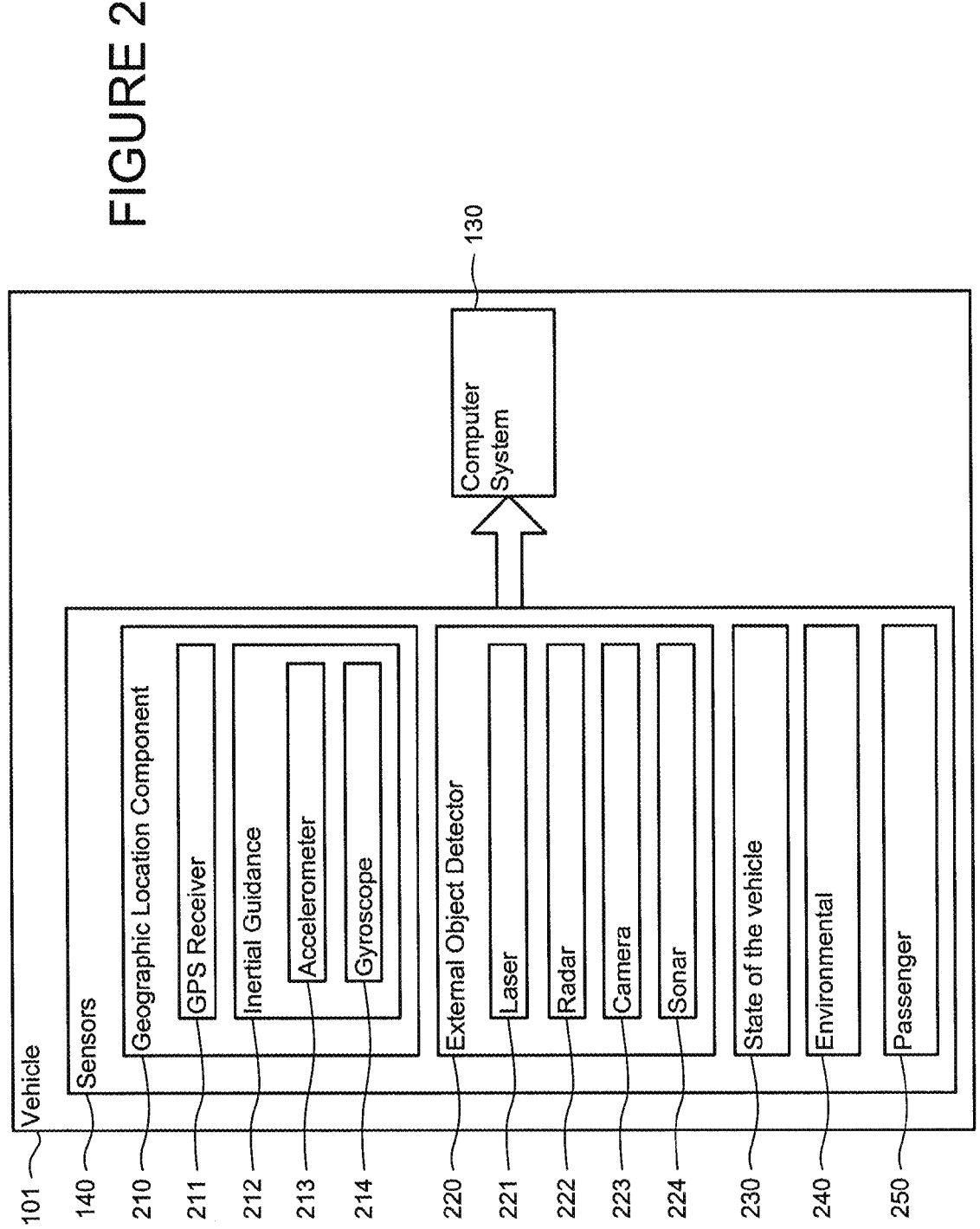
FIG. 2 is a functional diagram of the sensors of an autonomous vehicle.

As shown in FIG. 2, the vehicle may include a variety of internal and external sensors 140 that provide data to autonomous vehicle computer system 130. The sensors allow the vehicle to understand and potentially respond to its environment in order navigate and to maximize safety for passengers as well as people or property in the surrounding environment. The sensors may be used to identify, track and predict the movement of objects as well, such as pedestrians and other vehicles. Yet further, the sensors may be used to provide recommendations. The sensors may include geographic location component 210, external object detector 220, state of the vehicle sensors 230, ambient sensors 240, passenger sensors 250, and other sensors that are not shown in FIG. 2.

Geographic location component 210 is used to determine the geographic location and orientation of the vehicle 101. For example, component 210 may include a GPS receiver 211 to determine the vehicle's latitude, longitude and/or altitude. Although references herein to the location of the vehicle will often refer to a location in latitude/longitude/altitude coordinates, the data representing the location of the vehicle may also be relative to other reference systems, such as the vehicle's distance from objects. Some reference systems may be subject to less noise than others.

The geographic location component may also include an inertial guidance system 212, which may in turn include an accelerometer 213 and gyroscope 214. The inertial guidance system 212 may determine the current orientation of the device and changes of speed in any direction. For example, the inertial guidance system 212 may detect when the vehicle is turning. It may also estimate the current location of the car relative to a starting location based on changes in speed and direction.

Other devices may also be used to determine the location of the vehicle 101. For example, if the external object detector 220 identifies an object and its location relative to the vehicle, and if processor 131 can access pre-existing data that identifies the geographic location of the object, then processor 131 can identify the geographic location of the vehicle. The system may also triangulate its location based on cell phone tower transmissions or the presence of smaller wireless networks. The processor may combine the information from the various components and detectors, or select the most accurate source, and determine the geographic location of the vehicle accordingly.

The vehicle may include an external object detection system 220 for detecting objects external to the vehicle such as other vehicles, obstacles in the roadway, traffic signals, signs, trees, etc. The detection system 220 may include a laser 221, radar 222, cameras 223, sonar 224 or and other detection devices.

Vehicle 101 may include a laser 221 mounted on the roof or other convenient location. In one aspect, the laser may measure the distance between the vehicle and object surfaces facing the vehicle by spinning on its axis and changing its pitch. The laser may also be used to identify changes in surface texture or reflectivity. Thus, the laser may be configured to detect lane lines by distinguishing between the amount of light reflected by a painted lane line relative to unpainted dark pavement.

Sensors 140 may further include various radar detection units 222, such as those used for adaptive cruise control systems. The radar detection units may be located on the front and back of the car as well as on either side of the front bumper. In addition to using radar to determine the relative location of external objects, other types of radar may be used for other purposes as well, such as conventional speed detection. Short wave radar may be used to determine the depth of snow on the road and to determine location and condition of the road surface.

One of the sensors may also include one or more cameras 223. If multiple cameras are used and the distances from each other are known, the parallax from the different images may be used to compute the distance to various objects which are captured by the cameras. Content may also be extracted from the images. For example, the vehicle may automatically slow down if its current speed is 50 mph and it detects, by using its cameras and using optical-character recognition, that it will shortly pass a sign indicating that the speed limit is 35 mph. Yet further, pattern matching and other feature detection algorithms may be used to determine the type of the object.

Ambient sensors 240 may determine environmental aspects that do not specifically relate to external object detection, such as air quality sensors for detecting the surrounding air's temperature, humidity, or particulates.

Sensors 140 may also include sensors for determining the state of the user, such as the driver and other passengers in a car. For example, passenger sensors 250 may include a video camera that is used to determine whether the driver is asleep. Other sensors may determine the state of the interior of the car such as interior temperature, humidity, seat and mirror positions, weight measurements and distributions of the occupants (driver and passengers).

Although not shown in FIG. 2 or described herein, the system and method may include other types of sensors as well including but not limited to active and passive infrared sensors and radio frequency sensors.

The sensors may output their determinations to computer system 130. The system and method permits various data configurations between the computer system and the sensors. The sensors may provide the data in relatively raw low-level form or independently process the sensed information and provide relatively high-level data. Many of these sensors provide data that is processed by the computer in real-time, that is, the sensors may continuously update their output and continuously or as-demanded provide that updated output to the computer system 130. Thus, some of the sensors may instantaneously provide information that can be directly processed by the processor of the central control, such as a self-contained speed radar detector. Other sensors may require the processor to process data received from the sensor over a range of time, e.g., determining the speed of an object by comparing changes in its position based on the output of laser 221.

The vehicle further includes navigation controls 150, at least some of which operate at the direction of processor 131. For example, a car's navigation controls may include steering, brakes, fuel throttle (e.g., accelerator), turn signals, and other systems that control the movement and speed of vehicle 101. In addition, when engaged, computer 110 may control some or all of these functions of vehicle 101 and thus be fully or partially autonomous. In that regard, central control 130 may maneuver the car in response to information from the sensors, such as using the external object detector 220 to avoid hitting external objects and using the data provided by geographic location component 210 to avoid objects. The vehicle may also have various user input devices for activating or deactivating one or more autonomous driving modes. In some aspects, the driver may take control of the vehicle from the computer system by turning the steering wheel, pressing the acceleration or deceleration pedals.

Figure 3:
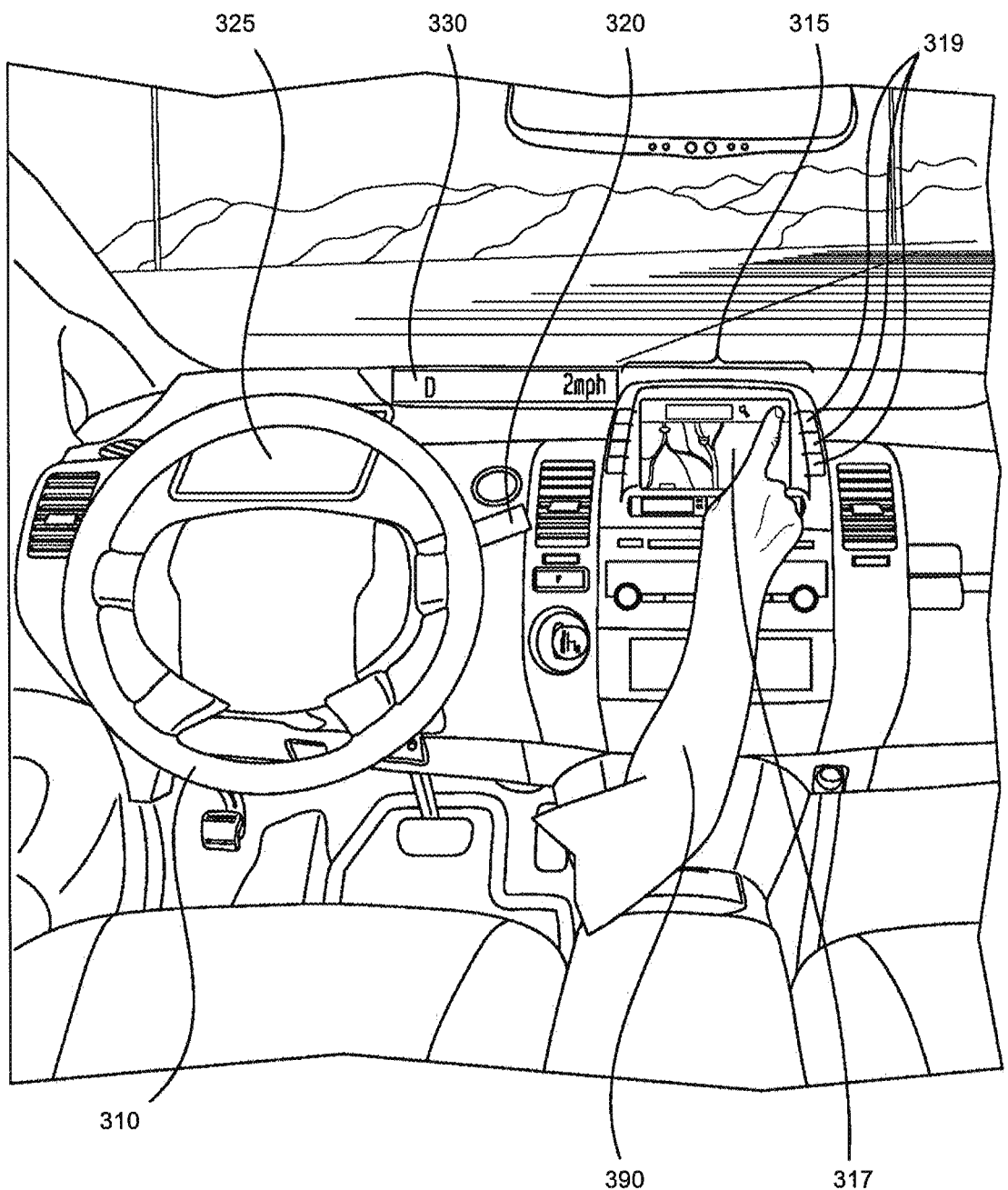
FIG. 3 is an illustration of an interior of an autonomous vehicle.

FIG. 3 depicts an exemplary design of the interior of an autonomous vehicle. The autonomous vehicle may include all of the features of a non-autonomous vehicle, for example: a steering apparatus, such as steering wheel 310; a navigation display apparatus, such as navigation display 315; and a gear selector apparatus, such as gear shifter 320.

As shown in FIGS. 1 and 3, the vehicle may include one or more user input devices 160 that enable a user to provide information to the computer system 130. A user, such as passenger 390, may input a destination (e.g., 123 Oak Street) into the navigation system using touch screen 317 or button inputs 319. In another example, the computer system may extract the destination from a user's spoken command. User input devices 160 may also include other devices typically used with computer systems, including a keyboard, microphone, pointing device (e.g., trackball or mouse)

The vehicle may also include a variety of devices for communicating information to a user. For instance, the interior of vehicle 101 may include an electronic display 325 (e.g., a monitor having a screen, a small LCD touch-screen or any other electrical device that is operable to display information). It may further include a status indicating apparatus, such as status bar 330, to indicate the current status of vehicle 101. In the example of FIG. 3, status bar 230 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, such indicators being readable by humans, other computers, or both.

Among other things, display 325 may display other information relating to the overall status of the vehicle, particular sensors, or computer system 130. The display 325 may include computer generated images of the vehicle's surroundings including, for example, the status of the computer, the vehicle itself, roadways, intersections, as well as other objects and information. Computer system 330 may further use visual or audible cues to indicate whether the computer system is obtaining valid data from the various sensors, whether the computer is partially or completely controlling the direction or speed of the car or both, whether there are any errors, etc.

As shown in FIG. 1, the vehicle may include communication systems 180, such as wireless transmitters and receivers, to communicate with one or more data repositories 190 over various types of networks (e.g., network 195). The data repository may comprise any device for storing or providing data, including databases and Internet content providers. In an additional or alternative aspect, the data from sensors 140 is provided directly to the communication system 180.

Figure 5:
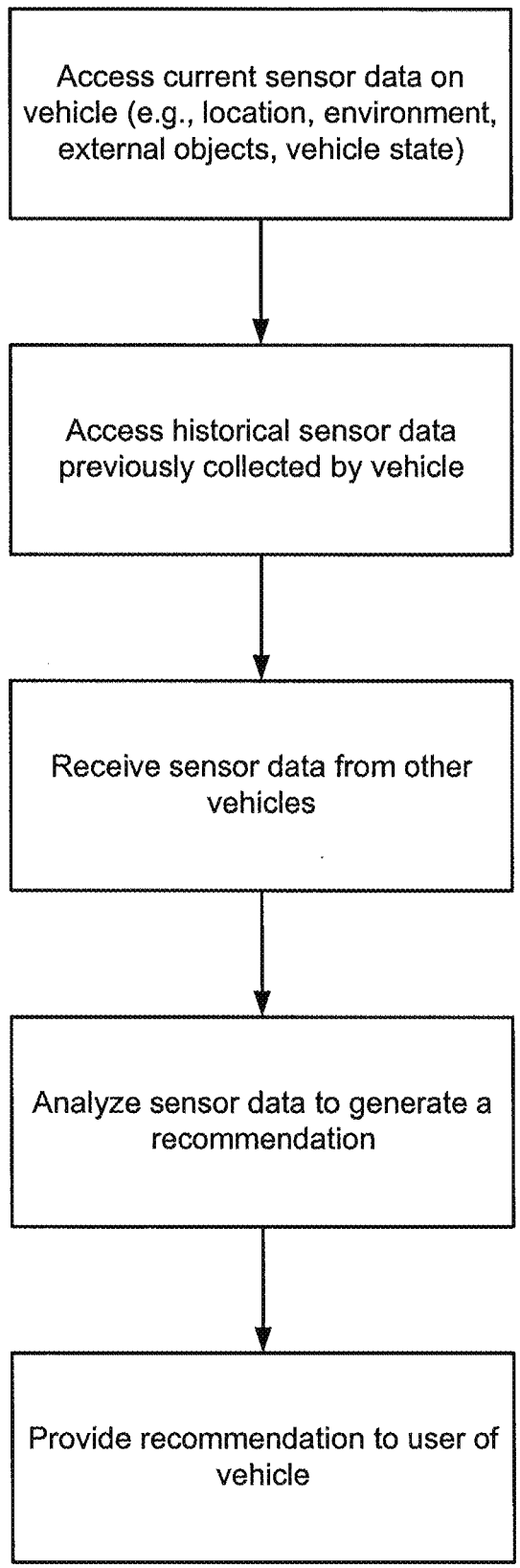
FIG. 5 is a flowchart.

In addition to the operations illustrated in FIG. 5, operations in accordance with system and method will now be described. Various operations can be handled in a different order or simultaneously, and each operation may be composed of other operations.

The above and following data propagation, collection, processing and recommendations may be controlled under vehicle users' permissions. The users may allow, disallow, or control the level of data sharing with other vehicles and third parties.

Based on data collected locally and from other vehicles, the computer system on vehicle 101 may process the data and make various kinds of recommendations to the user and recommendations to third parties. Recommendations may be made based on data collected solely from and processed by the user's vehicle.

In one aspect, the system and method makes recommendations based both on data that was previously collected by the sensors and, at the time of the recommendation, is currently being collected by the sensors. POI based on what has been visited in the past For example, computer system 131 may provide the user with a recommended point of interest (POI) to visit. At the user's request, processor 131 may select the destination by consulting the data it received from geographic location component 210 the last time the vehicle was in the current geographic area. Processor 131 may then compare its current location with how long vehicle 101 has stayed at a particular POI, such as a restaurant. Depending on the average amount of time that the user stayed at a particular place, and based further on the vehicle's current position, processor 131 may then recommend a specific restaurant or other POI. By way of example, if the vehicle is currently near a POI that the user has previously stayed at for 30 minutes or more, the vehicle may identify the recommended destination and ask the user if they would like to be brought to the POI.

The recommended action may be performed automatically. Continuing the foregoing example, vehicle 101 may automatically bring the user to the recommended destination if the user indicates to the vehicle that he or she accepts the recommendation.

Prior to receiving a recommendation, the user may enter destination information into computer system 130, and the vehicle may suggest a route based on the current location provided by the geographic location component and map data that is available to the computer system. The user's designated destination may be used when making the recommendation, e.g., recommending POI near the destination.

In addition to recommending points of interest depending on information received from the sensors, the vehicle may also recommend locations to avoid. For instance, the data collected by vehicle 302 may indicate a pattern of avoiding certain commercial districts during a specific time of day. As such, the computer system may recommend that the user avoid certain routes or areas during that time based on the starting and destination address entered by the user in a navigation request.

The system and method may base its recommendation on prior sensor data may have been captured a significant amount of time before the current sensor data. For example, the system and method may rely on data that was collected well prior to the currently sensed data while travelling along the then-current route. It may evaluate data that was taken at least a specific time period in advance, e.g., at least one day before the moment the latest sensor data was captured. It may also evaluate data that was collected while the vehicle was travelling along a different route. The prior data may also have occurred while the vehicle was travelling the same route but on an earlier different trip (e.g., the car took the same streets between the same origination and destination earlier in the day).

Figure 4:
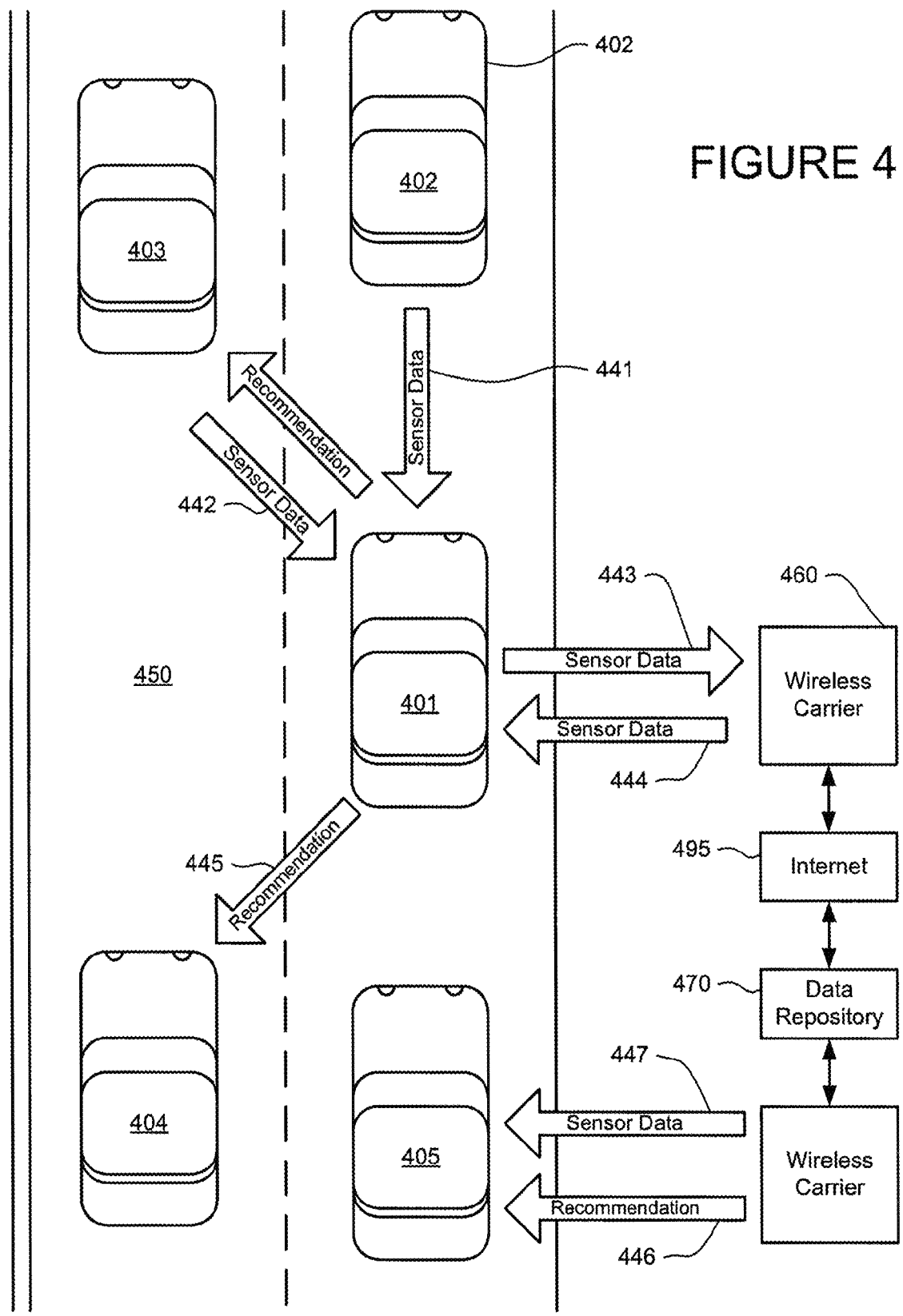
FIG. 4 is a functional diagram of communications between autonomous vehicles.

Recommendations may be made based on data collected from other vehicles as well as the data collected locally from the vehicle. By way of example, FIG. 4 illustrates four vehicles 401-405 travelling on road 450. With the permission of both users, autonomous vehicle 401 may receive sensor data 441 from autonomous vehicle 402. Sensor data 441 data may include sensor data that vehicle 402 has previously accumulated and is currently sensing. The information may be transmitted wirelessly directly between the two vehicles, e.g., via external communication component 180 using radio, cellular, optical or other wireless signals.

The information transmitted between vehicles may include the data output from the sensors to the computer system 131 or may comprise more processed information. By way of example, vehicle 402 may transmit relatively raw sensor data such as the signals acquired by laser 221. Alternatively, if vehicle 402 identified a particular object based on the laser data, the vehicle may transmit the type of detected object and its location relative to vehicle 401 after the computer system 131 identifies the object.

The vehicle may generate a recommendation based on information provided by both the other vehicle and the current vehicle. For example, processor of vehicle 401 may consider its previously sensed data (e.g., the average times that vehicle 401 has spent at different restaurants), its currently sensed data (e.g., its current location) and the currently sensed data from another vehicle (e.g., the amount of snow at the location of vehicle 402) when generating a recommendation (e.g., going to a different restaurant than the one requested by the user if the weather conditions are bad at the location near the requested restaurant). In that regard, the recommended action may be determined based on the sensors (e.g., GPS receivers) that identify the current and past location of the car, as well as sensors that do not identify the location of the car (e.g., road conditions).

The vehicle may also rely on data previously sensed by another vehicle. For instance, vehicle 402 may also transmit the amount of snow it encountered at previous locations, some of which may be visited or will soon be visited by vehicle 401.

An autonomous vehicle may also generate recommendations based on the data obtained from multiple vehicles. For example, vehicle 401 may also receive and use the current conditions at vehicle 403 in order to provide a recommendation to the user of vehicle 401.

In addition to directly communicating with other vehicles, the vehicle may obtain sensor data from other vehicles via the use of intermediate transmitters and receivers that are stationary. For instance, the vehicle may access a database containing sensor data obtained from other vehicles. As shown in FIG. 4, vehicle 401 may use the Internet 495 to upload its sensor data to data repository 470 by communicating wirelessly with a cell phone base station of wireless carrier 460. In return, it may download sensor data that has been obtained by data repository 470 from other vehicles and use it to generate a recommendation to the user of vehicle 401.

In addition to transmitting sensor data to other vehicles, a vehicle may also transmit recommendations. For example, vehicle 401 may recommend to vehicle 402 that it take a different course if it appears that vehicle 402 is headed to an unsafe location. If vehicle 401 is in communication with vehicle 404, vehicle 401 may transmit the same recommendation 445 to vehicle 404. It may also transmit the sensor data 441 from vehicle 402 to vehicle 404, effectively functioning as an intermediary for the sensor data from vehicle 402. In that regard, sensor data may be gathered and recommendations generated and transmitted between vehicles without the use of stationary base stations. The vehicles may also transfer information to each other via a stationary wireless network, particularly if the distance between the vehicles makes it difficult to establish a direct connection. In that regard, vehicle 401 may transmit its sensor data 447 and recommendations 446 to vehicle 405 by wireless connecting to Internet 495 via wireless carrier 460.

The system and method may provide routing-related recommendations based on other data as well. For example, by accruing sensor data over a time period, the computer system on vehicle 101 may derive the traffic densities, cross-roads, pedestrian distributions, busy corners and various other features for a particular neighborhood or a geographic boundary. Based on such data, as well as the user's past driving routes, the system may make various recommendations of nearby POIs or recommend certain routes to avoid. The recommendations may relate to alternative routes, i.e., presenting different combinations of streets to get to a specific destination.

Vehicle 401 may use the data to determine how to maneuver the vehicle (e.g., slowing down based on turns or traffic jams detected by other vehicles, taking an alternative route, or taking an evasive action to avoid an object such as a deer).

A vehicle may also choose to use data from other sources for its recommendations if the source is considered trustworthy. For example, different vehicles may be associated with different vendors, and a first vehicle might only trust the data sent from a second vehicle if the second vehicle cryptographically signed the data, and if the first vehicle can verify the signature. Moreover, the vehicle may perform different maneuvers based on different levels of trust. For instance, information from vehicles from unknown vendors may only be used for slowing the user's vehicle down but information from trusted vendor vehicles may be used for slowing the user's vehicle down and changing lanes. If received data has some indicia that implies that the source is counterfeit or otherwise not trustworthy, the data might not be used at all or only used to add weight to a factor that is consistent with already-sensed data.

The vehicles may exchange other information that does not correspond with the information obtained by the sensors and use such information when generating a recommendation. By way of example, vehicles 402 and 403 may transmit their user profile along with their sensor data 441 and 442, respectively. Vehicle 401 may compare that user profile with its own user's profile when basing a recommendation on data provided by vehicle 402. In that regard, if vehicle 401 is generating a route recommendation based on the routes traveled by vehicles 402 and 403, vehicle 401 may allocate additional weight to the route traveled by the vehicle with the most similar user profile. It may also allocate more weight to information received from vehicles of a similar type regardless of the profile of the user.

The user profile information may comprise any information that is related to the user. For example, in response to a prompt from the computer 130, the user may be asked to enter user identification (e.g., the driver's name or a reference number) and/or other user attribute data such as gender and age. The profile information may also include various user preferences such as preference for vehicle operation (e.g., warning when vehicles in adjacent lanes move within a predetermined safety distance), preference for vehicle interior conditions (e.g., seat positions or vehicle temperatures), and route or navigation preference (e.g., a preferred route to a specific destination during a specific time, and making one or more specific stops along the route), etc. This information may be used by vehicle 101 without regard to other vehicles, e.g., the computer system 130 may ascribe more weight to weather conditions when a user has indicated a relatively low tolerance for driving in less than optimal conditions.

The autonomous vehicle may make unsolicited recommendations in addition to responding to requests from the user. For example, if the data from vehicle 402 indicates that the road conditions near an intended destination POI are unsafe, vehicle 401 may—without prompting—display a message to the user recommending a different POI.

The recommendations may also be made to various interested third parties, for example, business (restaurants, shops, etc.) owners and market survey providers. These third parties may also be provided with options to subscribe to receiving recommendations from various autonomous vehicles. In that regard, the recommendations may be provided to data repository 470, which in turn provides the recommendations to the third parties. Third parties may also be provided with the raw data collected by the sensors (with the user's permission, as noted above).

In one aspect, third parties may locate businesses based on the aggregation of the raw data. For example, a fueling station operator may, based on the number of vehicles driven within a particular geographic region and the fuel levels of these vehicles, make decisions as to whether to build a gas station in the region.

In another aspect, autonomous vehicle service providers may adjust pricing to use the autonomous vehicle based on these data. Governments may also make various public service deployment decisions (e.g., road or neighborhood development, expenditure or infrastructure allocations) based on the sensor data. The information may also be used by service providers, such as map providers, to update their databases and make any changes available to other autonomous vehicles, for example, by transmitting the information automatically or by making available downloadable updates.

The recommendations may be provided to the user in variety of ways. For example, the recommendation may be shown on display 325 as shown in FIG. 3. It may also be shown on status bar 330 or spoken to the user.

The information from the sensors may be used to change the current path and speed of the vehicle. The data from the sensors permits the central control 130 to determine whether the vehicle's then-current direction or speed should be modified in response to the sensed environment. By way of example, if the vehicle is operating in a completely autonomous mode, computer system 130 may cause the vehicle to accelerate (e.g., by increasing fuel or other energy provided to the engine), decelerate (e.g., by decreasing the fuel supplied to the engine or by applying brakes) and change direction (e.g., by turning the front two wheels). For instance, if the computer determines that an object is obstructing the intended path of the vehicle, it may slow down and maneuver the vehicle around the obstruction.

The vehicle may continuously use the sensor data to identify objects, such as traffic signals, people, other vehicles, and other objects, in order to maneuver the vehicle to the destination and reduce the likelihood of a collision. The vehicle may use the map data to determine where traffic signals or other objects should appear and take actions, for example, by signally turns or changing lanes.

In addition to processing data provided by the various sensors, the computer may rely on environmental data that was obtained at a previous point in time and is expected to persist regardless of the vehicle's presence in the environment. For example, data 134 may include detailed map information, e.g., highly detailed maps identifying the shape and elevation of roadways, lane lines, intersections, crosswalks, speed limits, traffic signals, buildings, signs, real time traffic information, or other such objects and information. Each of these objects such as lane lines or intersections may be associated with a geographic location which is highly accurate, for example, to 15 cm or even 1 cm. The map information may also include, for example, explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

It will be further understood that the sample values, types and configurations of data described and shown in the figures are for the purposes of illustration only. In that regard, systems and methods in accordance with aspects of the invention may include various types of sensors, communication devices, user interfaces, vehicle control systems, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the systems and methods as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects. Unless expressly stated to the contrary, every feature in a given embodiment, alternative or example may be used in any other embodiment, alternative or example herein.

The invention claimed is:

1. A first vehicle comprising:
   navigation controls,
   a processor,
   a memory comprising instructions executable by the processor, and
   a wireless signal receiver,
   wherein the instructions comprise:
   receiving first data based on information collected from a sensor affixed to a separate vehicle that senses an aspect of the environment surrounding the separate vehicle,
   determining a first, second or third trust level based on indicia of the trustworthiness of the first data, where the first trust level indicates greater trustworthiness than the second trust level, and the second trust level indicates greater trustworthiness than the third trust level,
   directing the navigation controls to steer the first vehicle based on the first data when the determined trust level is the first trust level,
   directing the navigation controls to slow the speed of the first vehicle based on the first data when the determined trust level is the second trust level, and
   not directing the navigation controls based on the first data when the determined trust level is the third trust level.

2. The first vehicle of claim 1, wherein determining a trust level comprises selecting the first trust level when a vendor associated with the separate vehicle is known.

3. The first vehicle of claim 1, wherein determining a trust level comprises selecting the second trust level when a vendor associated with the separate vehicle is not known.

4. The first vehicle of claim 1, wherein determining a trust level comprises selecting the first trust level when the first data is cryptographically signed and the signature is verifiable.

5. The first vehicle of claim 1, wherein directing the vehicle navigation controls to steer the first vehicle comprises directing the vehicle to change lanes.

6. The first vehicle of claim 1, wherein the first data indicates the presence of an object to be avoided by the first vehicle.

7. The first vehicle of claim 6, wherein directing the vehicle navigation controls to steer the first vehicle comprises directing the first vehicle to take evasive action to avoid the object.

8. The first vehicle of claim 6, wherein directing the vehicle navigation controls to slow the speed of the first vehicle comprises slowing the first vehicle to avoid hitting the object.

9. The first vehicle of claim 1 further comprising a sensor affixed to the first vehicle, and wherein directing the vehicle navigation controls to steer the first vehicle and slow the first vehicle down are also based on the information provided by the sensor affixed to the first vehicle.

* * * * *